Feb. 13, 1934.  H. W. KLEIST  1,946,496
REFRIGERATING APPARATUS
Filed Dec. 20, 1930
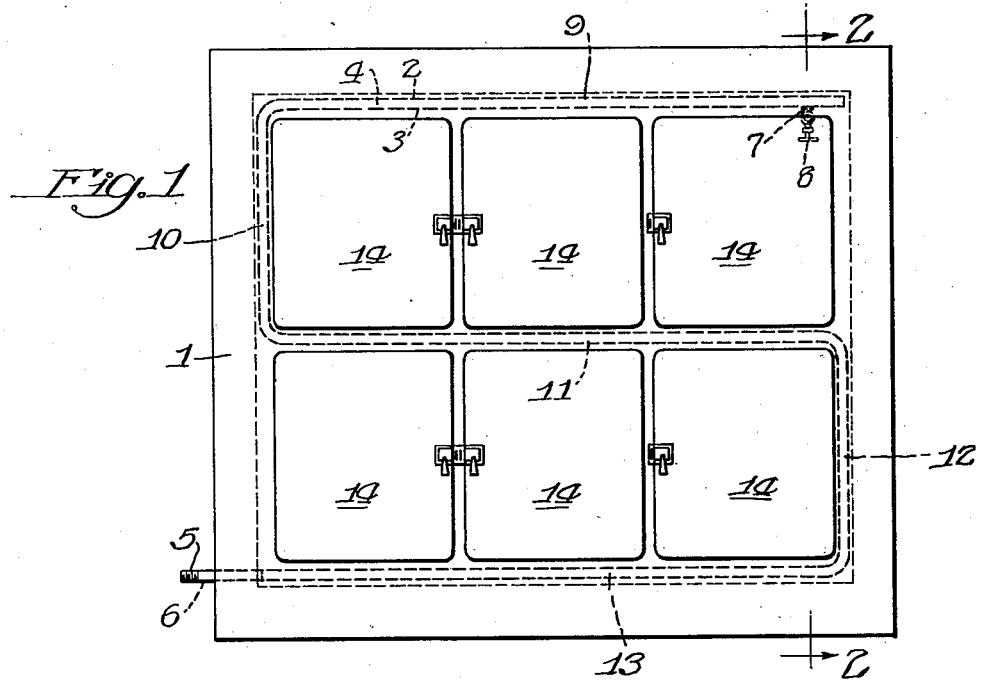
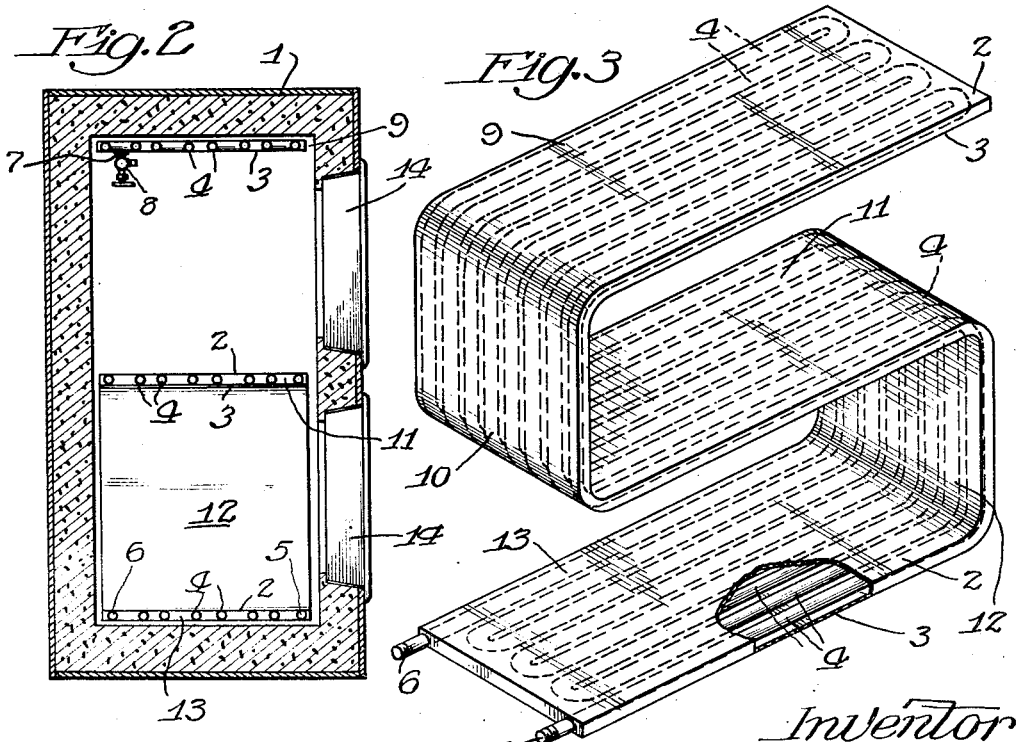
Inventor
Herman W. Kleist
By Parker & Carter Attys Patented Feb. 13, 1934

1,946,496

UNITED STATES PATENT OFFICE 1,946,496

REFRIGERATING APPARATUS

Herman W. Kleist, Chicago, Ill., assignor to Dole Refrigerating and Machine Company, Chicago, Ill., a corporation of Illinois Application December 20, 1930
Serial No. 503,664

7 Claims. (Cl. 62—99)

This invention relates to improvements in refrigerating apparatus and has for its object to provide a new and improved device of this description. The invention has as a further object to provide a refrigerating apparatus particularly adapted to be used in connection with frozen food products. The invention has as a further object to provide a refrigerating apparatus arranged to secure the refrigerating effect and at the same time prevent air circulation in the apparatus. The invention has other objects which are more particularly pointed out in the accompanying description.

Referring now to the drawing, Fig. 1 is a front view showing one form of apparatus embodying the invention;

Fig. 2 is a sectional view taken on line 2—2 of Fig. 1; and

Fig. 3 is a view of the refrigerating element separate from the receptacle in connection with which it is used.

Like numerals refer to like parts throughout the several figures.

A refrigerating apparatus for use with frozen meats and other frozen food products is most effective in properly preserving the food products when it is arranged so that there is no circulation of air in the refrigerating receptacle in which the food products are kept. In the apparatus herein shown this result is secured. This construction consists of a receptacle 1 of suitable insulating capacity, within which the food products are kept. Within this receptacle is a lining consisting of the separated metal plates 2 and 3. Located between these plates are pipes 4 which extend back and forth therealong and in which the refrigerant is received. The plates 2 and 3 are arranged to form a hermetically sealed chamber for the pipes 4. These pipes may be arranged in any suitable manner, and as herein shown they are arranged in the form of a coil, having an inlet 5 and an outlet 6 which are connected to a suitable refrigerating machine for circulating the refrigerant through the coils. The air is exhausted from between the plates 2 and 3, and this prevents moisture from depositing on the coils of the pipe 4 and also causes the plates 2 and 3 to be pressed tightly against the coils of said pipe. The air is exhausted by means of a suitable connecting element 7, which communicates with the space between the plates 2 and 3 and which is adapted to be connected with a suitable air removing device.

After the air is removed, the valve 8 is tightly closed so as to maintain a vacuum in the chamber between the plates. The plates 2 and 3 and the pipe 4 between them are bent, as shown in Fig. 3, into an S shaped form, thus providing at the top of the receptacle the cooling section 9, and at one side of the receptacle the cooling section 10, and near the middle of the receptacle the cooling section 11, and at the other side of the receptacle the cooling section 12, and at the bottom of the receptacle the cooling section 13. If only a small cooling receptacle is used, then the place may be bent into a U form, omitting the parts 12 and 13.

The food products to be refrigerated are placed in between the sections 9 and 11 and the sections 11 and 13. It will therefore be seen that there are cooling sections above and below the food products, and this construction prevents circulation of the air in the refrigerating receptacle, as the air at the bottom will be cooled by the bottom section and therefore will not rise so as to produce a circulation, and the air at the top will be cooled by the top section. Since the temperature of the two sections is substantially the same, there will be no circulation of air between them.

The receptacle 1 is provided with suitable doors 14 through which access to the interior is provided for inserting and removing the food products. The use and operation of my invention are as follows:

When the parts are in the position shown and the air is exhausted from between the plates 2 and 3, the refrigerating fluid is circulated through the coils of the pipe 4 by means of any suitable circulating apparatus. The food products are placed in the receptacle between the sections 9 and 11 and the sections 11 and 13 of the refrigerating element. It will be seen that when a large receptacle is used, there is a section near the middle so as to prevent there being any comparatively warm portion of the receptacle. If the receptacle is small, this is not necessary, it being necessary to have a section only at the top and bottom.

I have found that this construction preserves the frozen food products efficiently and maintains in them their original flavor and appearance, and prevents circulation of air in the receptacle. The device may, of course, be used with other products than frozen food products, but it is particularly adapted for preserving such frozen food products.

I claim:

1. A refrigerating apparatus comprising a receptacle provided with heat insulating walls, a refrigerating element on the interior of said receptacle comprising metal plates separated by a space, a pipe coiled between said plates and through which the refrigerant is circulated, said plates extending across the top of the space within said chamber and partway down one side, and then across said space intermediate the top and bottom thereof, and then partway down the other side, and then across the bottom of said space.

2. A refrigerating apparatus comprising a receptacle provided with heat insulating walls, a refrigerating element on the interior of said receptacle comprising metal plates separated by a space, a pipe coiled between said plates and through which the refrigerant is circulated, said plates extending across the top of the space within said chamber and partway down one side, and then across said space intermediate the top and bottom thereof, and then partway down the other side, and then across the bottom of said space, and means for tightly clamping the plates against the coils of said pipes.

3. A refrigerating apparatus comprising a receptacle provided with heat insulating walls, a refrigerating element on the interior of said receptacle comprising metal plates separated by a space, a pipe coiled between said plates and through which the refrigerant is circulated, said plates extending across one end wall of the space within said chamber and partway along one side wall, and then across said space intermediate the end walls thereof, and then partway along the other side wall, and then across the other end wall of said space, said plates being hermetically sealed, and means for exhausting air from between them so as to form a vacuum in the space between said plates.

4. A refrigerating apparatus comprising a receptacle having heat insulating walls, a refrigerating element on the interior of said receptacle comprising two plates with a coil between them, and means for preventing the circulation of air in the receptacle when the refrigerating element is being used to cool the interior of said receptacle which consists in forming said plates and coils S-shaped.

5. A refrigerating apparatus comprising a food receiving receptacle provided with heat insulating walls, a refrigerating element within said receptacle and extending across the top and the bottom thereof and between which the food is received, said refrigerating element comprising two separated metal plates, a coiled pipe between them and through which the refrigerating material is circulated.

6. A refrigerating apparatus comprising a food receiving receptacle provided with heat insulating walls, a refrigerating element within said receptacle and extending across the top and the bottom thereof and between which the food is received, said refrigerating element comprising two separated metal plates, a coiled pipe between them and through which the refrigerating material is circulated, said plates being hermetically sealed and having the air exhausted from between them.

7. A refrigerating apparatus comprising a receptacle having heat insulating walls, a cooling device at the top and bottom of the interior of said receptacle, and a cooling device extending across the receptacle intermediate the top and bottom thereof, and dividing it into upper and lower food receiving sections, said cooling devices comprising plates with coils between them, and means for exhausting the air from between said plates to form a vacuum in the space between them.

HERMAN W. KLEIST.